（12）United States Patent
Bikumala et al.

(10) Patent No.: US 11,597,291 B1
(45) Date of Patent: Mar. 7, 2023

(54) TRANSFERRING POWER BETWEEN A DRONE AND A DEVICE DURING DELIVERY

(71) Applicant: Dell Products L. P., Round Rock, TX (US)

(72) Inventors: Sathish Kumar Bikumala, Round Rock, TX (US); Jace W. Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 574 days.

(21) Appl. No.: 16/655,292

(22) Filed: Oct. 17, 2019

(51) Int. Cl.
| | |
|---|---|
| *B60L 53/60* | (2019.01) |
| *G06F 13/42* | (2006.01) |
| *B60L 53/12* | (2019.01) |
| *B60L 53/14* | (2019.01) |
| *B64C 39/02* | (2006.01) |

(Continued)

(52) U.S. Cl.
CPC .............. *B60L 53/60* (2019.02); *B60L 50/60* (2019.02); *B60L 53/12* (2019.02); *B60L 53/14* (2019.02); *B60L 53/30* (2019.02); *B64C 39/024* (2013.01); *G06F 13/4282* (2013.01); *H02J 7/342* (2020.01); *B60L 2200/10* (2013.01); *B64C 2201/027* (2013.01); *B64C 2201/042* (2013.01); *B64C 2201/066* (2013.01); *B64C 2201/128* (2013.01); *G06F 2213/0042* (2013.01)

(58) Field of Classification Search
CPC .......... B60L 50/60; B60L 53/12; B60L 53/14; B60L 53/30; B60L 53/60; B64C 39/024; B64C 2201/027; B64C 2201/042; B64C 2201/066; B64C 2201/128; G06F 13/4282; G06F 2213/0042; H02J 7/342
USPC ............................................................ 701/3
See application file for complete search history.

(56) References Cited

U.S. PATENT DOCUMENTS

| | | | | |
|---|---|---|---|---|
| 8,922,066 | B2 * | 12/2014 | Kesler ...................... | H03H 7/40 307/104 |
| 9,139,310 | B1 * | 9/2015 | Wang ...................... | B60L 53/14 |

(Continued)

FOREIGN PATENT DOCUMENTS

| | | | | | |
|---|---|---|---|---|---|
| CN | 107608380 | A | * | 1/2018 | |
| KR | 20190056345 | A | * | 5/2019 | .............. B60L 53/12 |

(Continued)

*Primary Examiner* — Atul Trivedi
(74) *Attorney, Agent, or Firm* — Krishnendu Gupta; Nikhil Patel

(57) ABSTRACT

A drone-based product delivery mechanism in which power is transferred between the drone's battery and a product's battery while the product is in transit to its destination. For a short distance delivery, the drone battery may be used to charge the product battery so that the product is delivered with a fully-charged battery. On the other hand, for long distance deliveries, the power from a fully-charged product battery may be used to charge the drone's battery to extend the flight time/radius of the drone or to supplement the drone battery to conserve its power. The power transfer may be carried out using a wireless connection or a wired connection. The wireless connection may be a Qi interface, whereas the wired connection may be a Universal Serial Bus (USB) connection. The product packaging may be re-designed to allow the desired power transfer between the drone and the product inside the packaging.

20 Claims, 2 Drawing Sheets

(51) Int. Cl.
   *B60L 53/30* (2019.01)
   *B60L 50/60* (2019.01)
   *H02J 7/34* (2006.01)

(56) References Cited

U.S. PATENT DOCUMENTS

| | | | | |
|---|---|---|---|---|
| 11,235,928 | B2* | 2/2022 | Lert, Jr. | B65G 1/1378 |
| 2014/0265555 | A1* | 9/2014 | Hall | H02J 50/50 |
| | | | | 307/9.1 |
| 2016/0039300 | A1* | 2/2016 | Wang | B64C 39/024 |
| | | | | 244/58 |
| 2017/0344000 | A1* | 11/2017 | Krishnamoorthy | G08G 5/0013 |
| 2018/0095468 | A1* | 4/2018 | Yang | H02J 50/05 |
| 2018/0109116 | A1* | 4/2018 | LaMarre | H02J 7/007 |
| 2018/0141453 | A1* | 5/2018 | High | G05D 1/0684 |
| 2018/0198308 | A1* | 7/2018 | Files | H04B 5/0037 |
| 2018/0201370 | A1* | 7/2018 | Yang | B64C 39/024 |
| 2018/0208070 | A1* | 7/2018 | Sanchez | B64C 39/024 |
| 2018/0219404 | A1* | 8/2018 | Urbach | G06F 3/012 |
| 2018/0312069 | A1* | 11/2018 | McClymond | B64F 1/36 |
| 2018/0354633 | A1* | 12/2018 | Wang | H02J 7/0029 |
| 2018/0366955 | A1* | 12/2018 | Rikoski | H02J 7/0042 |
| 2019/0047701 | A1* | 2/2019 | Winkle | H02J 7/0013 |
| 2019/0126769 | A1* | 5/2019 | Schmalzried | B60L 53/65 |
| 2019/0143827 | A1* | 5/2019 | Jaugilas | B64C 39/024 |
| | | | | 320/109 |
| 2019/0196575 | A1* | 6/2019 | Grobelny | G06F 1/263 |
| 2019/0197463 | A1* | 6/2019 | Blake | B60L 58/12 |
| 2019/0247050 | A1* | 8/2019 | Goldsmith | A61F 2/82 |
| 2019/0308514 | A1* | 10/2019 | Parimi | B60L 53/122 |
| 2019/0329903 | A1* | 10/2019 | Thompson | B64C 27/32 |
| 2019/0348848 | A1* | 11/2019 | Segnit | H02J 7/0042 |
| 2021/0101680 | A1* | 4/2021 | Naderi | H02J 50/402 |
| 2021/0237606 | A1* | 8/2021 | McNair | B60L 53/53 |
| 2021/0271303 | A1* | 9/2021 | Vichare | G06N 5/04 |

FOREIGN PATENT DOCUMENTS

| | | | | |
|---|---|---|---|---|
| TW | M597988 U * | 7/2020 | | Y02T 90/16 |
| WO | WO-2014152004 A1 * | 9/2014 | | B60L 53/12 |
| WO | WO-2019023111 A1 * | 1/2019 | | G05D 1/0088 |
| WO | WO-2019083637 A1 * | 5/2019 | | B60L 53/36 |
| WO | WO-2019126012 A1 * | 6/2019 | | B60L 53/20 |
| WO | WO-2019183927 A1 * | 10/2019 | | |
| WO | WO-2019186118 A1 * | 10/2019 | | B60L 50/50 |
| WO | WO-2020176860 A1 * | 9/2020 | | B60L 53/12 |
| WO | WO-2021158313 A1 * | 8/2021 | | H04L 47/125 |

* cited by examiner

TRANSFERRING POWER BETWEEN A DRONE AND A DEVICE DURING DELIVERY

TECHNICAL FIELD

This disclosure generally relates to product delivery using drones, and more specifically to a system and method of transferring power between a drone's battery and a product's battery during delivery of the product.

BACKGROUND

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems include many different types of consumer and commercial electronic devices such as, for example, personal computers (e.g., desktops or laptops), tablet computers, mobile devices (e.g., personal digital assistants (PDAs) or smart phones), corporate (or small business) server and data processing systems, and the like. These devices may vary in size, shape, performance, functionality, and price. Another category of information handling systems includes modern Unmanned Aerial Vehicles (UAVs), which are aircrafts without a human pilot on board. A UAV is commonly known as a "drone," and, hence, in the discussion below, the terms "UAV" and "drone" may be used interchangeably. The drones, as information handling systems, include communications, data processing, and remote guidance capabilities enabling them to be deployed for various unmanned, aerial missions such as, for example, military transport/reconnaissance, policing/surveillance, product deliveries, aerial photography, scientific explorations, goods smuggling, and so on. The flight of a UAV may be controlled by a ground-based controller or through satellite communication, and may operate with various degrees of autonomy—either under remote control by a human operator (for example, a ground-based operator) or autonomously by onboard computers/processors. Retailers are experimenting with delivery of products using drones. One issue with using a drone to deliver a product is that the battery of the drone should have sufficient capacity to (i) deliver the product to the customer and (ii) return to a location that is accessible to the shipper.

SUMMARY

This Summary provides a simplified form of concepts that are further described below in the Detailed Description. This Summary is not intended to identify key or essential features and should therefore not be used for determining or limiting the scope of the claimed subject matter.

The present disclosure relates to a drone-based product delivery mechanism in which power is transferred between a drone's rechargeable battery and a product's rechargeable battery while the product is in transit to its destination. In certain embodiments, the direction of transfer of power—whether from the UAV/drone to the product or from the product to the UAV/drone—may depend on the delivery distance. For example, for a short distance drone delivery, the drone battery may be used to charge the product/device battery so that the device is delivered with a fully-charged battery. On the other hand, for long distance deliveries, the power from a fully-charged device battery may be used to charge the drone's battery to extend the flight time of the drone and also to supplement the drone battery to conserve its power. In particular embodiments, the power transfer may be carried out using a wireless connection or a wired connection between the two batteries. The wireless connection, in some embodiments, may be a Qi interface, whereas the wired connection may be a Universal Serial Bus (USB) connection.

In one embodiment, the present disclosure is directed to a method, which comprises: (i) determining, by a processor in an Unmanned Aerial Vehicle (UAV), that a product containing a first battery is to be delivered by the UAV; and (ii) initiating, by the processor, a transfer of power between the first battery and a second rechargeable battery in the UAV.

In another embodiment, the present disclosure is directed to a product delivery system, which comprises: (i) a drone operable to deliver a product containing a first rechargeable battery, wherein the drone contains a second rechargeable battery that powers the drone; and (ii) an electrical connection to facilitate a transfer of power between the first and the second batteries during delivery of the product by the drone.

In a further embodiment, the present disclosure is directed to a delivery box that comprises: (i) a housing that receives a product package containing a product that has a first rechargeable battery, wherein the delivery box is carried by a drone to deliver the product package at a destination; and (ii) a charging port that provides an electrical connection between the first rechargeable battery and a second rechargeable battery in the drone that powers the drone, thereby facilitating a transfer of power between the first and the second batteries during delivery of the product package by the drone.

In today's fast-paced world, product deliveries via drones may become a necessity to get the products to the customers fast. Such faster deliveries, when accompanied by the charging of the product's battery during transit, would undoubtedly delight the customers because their ordered product/device will arrive fully-charged and ready to go. On the other hand, in case of devices/products already having a fully-charged battery prior to delivery, the battery power may be used to supplement the drone's battery when deliveries are beyond a certain distance. In certain embodiments, the product packaging may be re-designed to allow the desired power transfer between a drone and the product inside the packaging.

BRIEF DESCRIPTION OF THE DRAWINGS

A more complete understanding of the present disclosure may be obtained by reference to the following Detailed Description when taken in conjunction with the accompa

DETAILED DESCRIPTION

Figure 1:
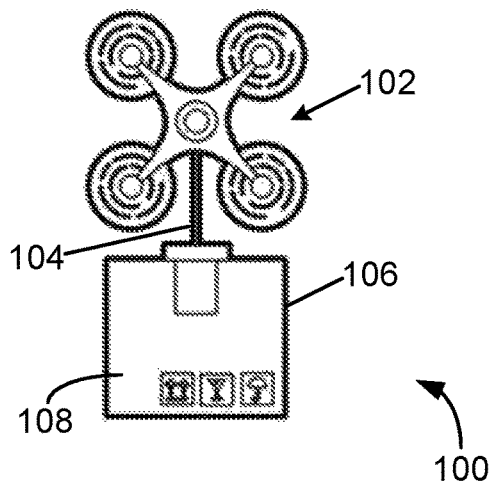
- FIG. 1 shows an exemplary product delivery arrangement using a drone with a single carrier arm as per particular embodiments of the present disclosure.

For purpose of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, a UAV/drone, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touch-screen and/or video display. The information handling system may also include one or more buses operable to transmit communications between the various hardware components.

It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism. Furthermore, a hyphenated term (e.g., "drone-based", "computer-readable", "pre-determined," etc.) may be occasionally interchangeably used with its non-hyphenated version (e.g., "drone based", "computer readable", "predetermined", etc.), and a capitalized entry (e.g., "Product Package", "Power Manager", "Drone Unit", etc.) may be interchangeably used with its non-capitalized version (e.g., "product package," "power manager", "drone unit", etc.). Such occasional interchangeable uses shall not be considered inconsistent with each other.

As mentioned before, drone delivery may become the future of product delivery because of its many benefits such as, for example, faster delivery, reduced emissions, access to remote areas, more accurate delivery, less susceptible to tampering of products during transit, and so on. Drones primarily operate on battery power and, hence, contain one or more rechargeable batteries to power their flights. Similarly, many electronic devices or products have rechargeable batteries that may or may not be fully-charged prior to delivery of such devices/products by drones. For ease of discussion, the terms "device" and "product" may be used interchangeably herein to refer to an item containing a rechargeable battery and operable using the power from such a battery.

In view of the above-mentioned presence of rechargeable batteries in both the drone and the product to be carried by the drone, the present disclosure provides for a drone-based product delivery mechanism in which the power is transferred between a drone's rechargeable battery and a product's rechargeable battery while the product is in transit to its destination. For example, for a short distance drone delivery, the drone battery may be used to charge the product/device battery so that the device is delivered with a fully-charged battery. On the other hand, for long distance deliveries, the power from a fully-charged device battery may be used to charge the drone's battery to extend the flight time of the drone and also to supplement the drone battery to conserve its power. Some of the products that may qualify for such power transfer include, for example, laptop computers, tablets, digital cameras/audio-visual devices, cell phones (including smart phones), PDAs, electronic book readers, video game consoles, and the like.

FIG. 1 shows an exemplary product delivery arrangement 100 using a drone 102 with a single carrier arm 104 as per particular embodiments of the present disclosure. The carrier arm 104 may remain extended from the center of the drone 102 and may have means (such as, for example, clips, hooks, a box-grabbing mechanism, and so on) (not shown) to securely attach it to a delivery box 106 containing a product package 108. In some embodiments, the reference numeral "106" also may refer to a housing of the delivery box in which the product package 108 is inserted for delivery by the drone 102. The actual product (not shown) being delivered by the drone 102 may be inside the product package 108. Examples of the products (such as laptops, tablets, smart phones, and the like) that may be relevant to the present disclosure are already given before. The product package 108 may be the package in which the product is generally supplied by the product's manufacturer or supplier. As discussed later below, the delivery box 106 may be designed to facilitate power transfer (in a wireless and/or wired manner) between the battery (not shown) of the product and that of the drone 102. In particular embodiments, as also discussed later, the product package 108 may be different in design than a traditional package to enable the desired power transfer through the delivery box 106.

Figure 2:
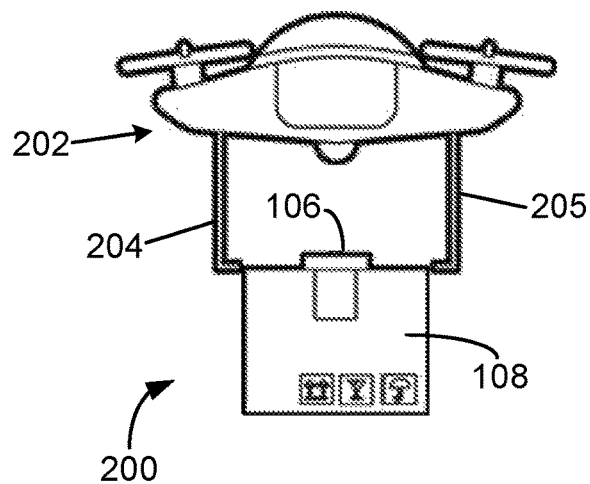
FIG. 2 depicts an exemplary product delivery arrangement using a drone with two carrier arms as per particular embodiments of the present disclosure.

FIG. 2 depicts an exemplary product delivery arrangement 200 using a drone 202 with two carrier arms 204, 205 as per particular embodiments of the present disclosure. For ease of discussion, the product package 108 and the delivery box 106 in FIGS. 1 and 2 are identified using the same reference numerals to indicate that the same delivery box 106 (and the product package 108 inside) may be delivered using either of the drones 102, 202. It is noted that, in some embodiments, the drone 202 may have more than two carrier arms. However, for the sake of the present disclosure, it is irrelevant how a product is carried using a drone—for example, with a single carrier arm as in case of FIG. 1, or with two (or more) carrier arms as in case of FIG. 2, or with a carrier configuration totally different from those discussed with reference to FIGS. 1-2. Therefore, specific carrier configurations of various drone designs are not discussed in any appreciable detail herein. It is observed, however, that although the carrier arms 204, 205 are shown as two side-arms extending from two sides of the drone 202 and grabbing the delivery box 106 on its sides (as opposed to at its center as in case of the carrier arm 104 in FIG. 1), the arms 204-205 may have different orientations (for example, one arm in the front of the drone 202 and one in the back) or there may be more than two arms circling the delivery box 106 at different locations on its periphery at the top. As before, details of individual carrier transport mechanisms are not relevant to the present disclosure and, hence, are not provided herein.

In some embodiments, the delivery box 106 may be removably attached to a drone arm (such as the carrier arm 104 or the arms 204-205) or other portion(s) of the drone, in which case, the delivery box 106 may or may not be delivered to the customer along with the product package 108. On the other hand, in certain embodiments, the delivery box 106 may be non-removably attached to a drone arm, in which case, the customer may need to take out the product package 108 from the delivery box 106 and return the delivery box 106 the drone's sender.

Figure 3:
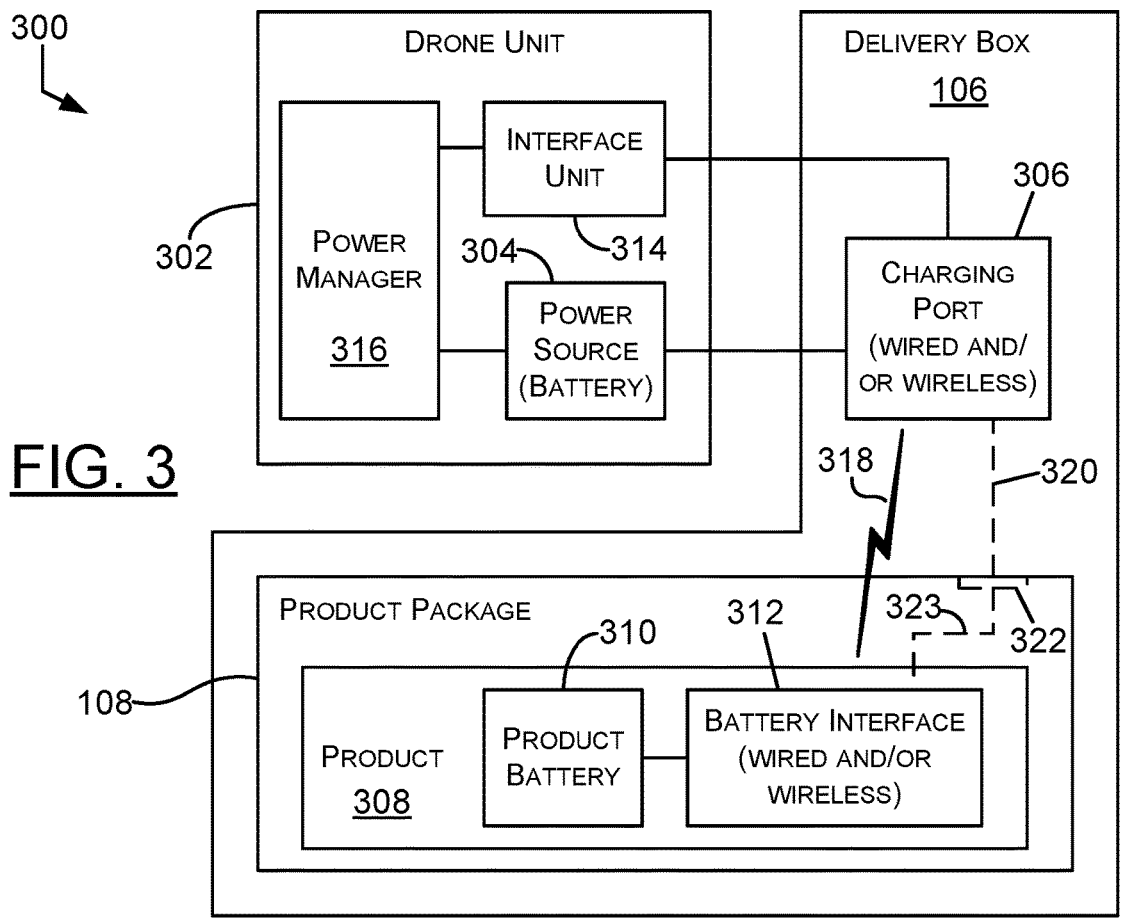
FIG. 3 shows an exemplary block diagram of a drone-based delivery arrangement depicting how power may be transferred between a drone battery and a product battery as per certain embodiments of the present disclosure.

FIG. 3 shows an exemplary block diagram 300 of a drone-based delivery arrangement depicting how power may be transferred between a drone battery (such as the battery 304) and a product battery as per certain embodiments of the present disclosure. In FIG. 3, a drone unit 302 is shown with a power source (a rechargeable battery) 304 that is electrically connected to a charging port 306 in the delivery box 106, which, in turn, is shown to be electrically connected to a product 308 inside the product package 108 for facilitating the power transfer. The charging port 306 may be located inside or outside the housing of the delivery box 106. The product 308 is shown to contain a rechargeable product battery 310 under operative control of a battery interface 312. The drone 302 also may include an interface unit 314 electrically connected to the charging port 306 in the delivery box 106. A power manager 316 in the drone 302 may operatively manage the transfer of power between the drone battery 304 and the product battery 310 as discussed in more detail later.

Figure 6:
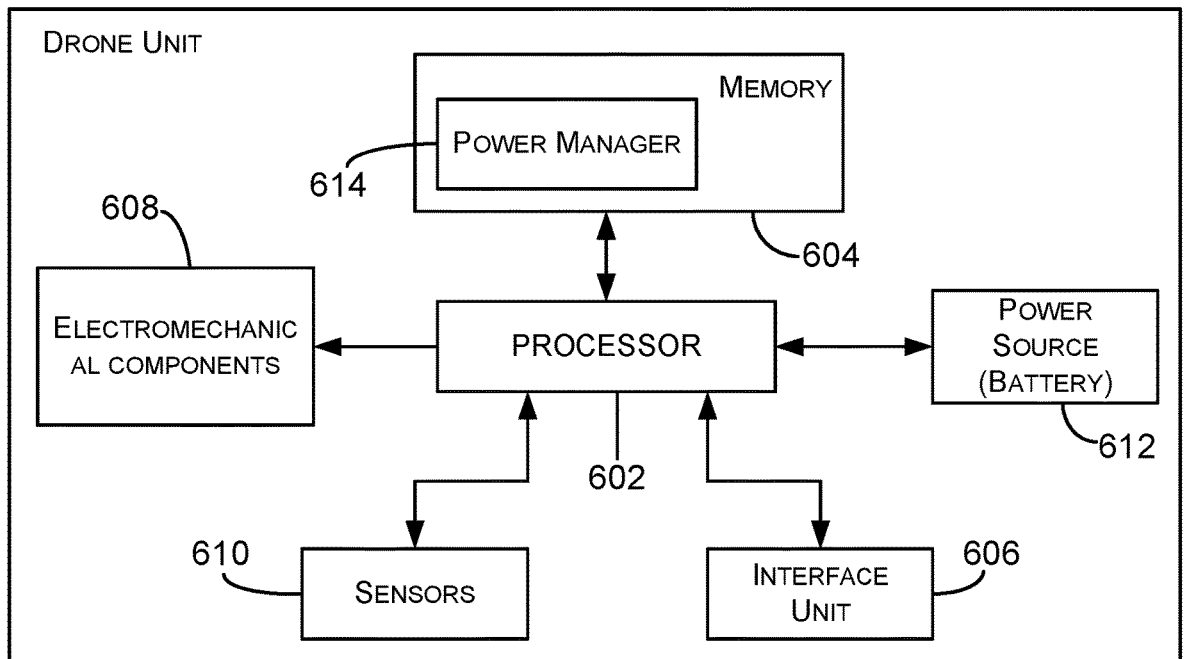
FIG. 6 illustrates an example configuration of a drone unit (or UAV) as per particular embodiments of the present disclosure.

As before, for ease of discussion, the same reference numerals are used in FIGS. 1-3 to identify the delivery box 106 and the product package 108. Furthermore, it is noted that the drone 302 in FIG. 3 may represent any of the drones 102, 202 in FIGS. 1-2, respectively. In some embodiments, the drone 302 may be completely different from the drones 102, 202 in FIGS. 1-2. In any event, the drone 302 may be a UAV that is configured as per teachings of the present disclosure to initiate and terminate power transfer to/from the product battery 310 as discussed later. For ease of discussion and simplicity of the drawings, only certain relevant components of various entities (for example, the drone 302, the product 308, and so on) are shown in FIG. 3. However, an exemplary architectural block diagram of the drone unit 302 with additional details is shown in FIG. 6 and discussed later below.

Referring again to FIG. 3, it is assumed that the battery interface 312 in the product 308 supports wireless charging/discharging. For example, if the product 308 is a laptop computer, the base of the laptop may include an inductive coil (not shown) as part of the battery interface 312 to enable wireless charging of the laptop battery 310. In one embodiment, the charging port 306 in the delivery box 106 also may include an inductive coil (not shown) that can be aligned with the coil in the product's battery interface 312 for wireless power transfer. Such wireless linking between the charging port 306 and the battery interface 312 is symbolically illustrated by a communication link identified using the reference numeral "318" in FIG. 3. For example, a copper coil or other type of inductive coil may be embedded in the delivery box 106 to operate as a wireless power transfer means. The product package 108 may be designed and inserted into the delivery box 106, for example, in a pre-defined manner, so that the inductive coil in the laptop base is in close proximity to a surface of the package 108 that is closest to the inductive coil in the delivery box 106, thereby assuring a good alignment with and close physical proximity to the coil in the box 106. In some embodiments, such surface of the package 108 or a portion of such surface near the product's inductive coil may be made thinner than other parts of the package 108 to reduce potential interference to the communication link 318. In other embodiments, packaging may be made such that there are no interfering materials (for example, metal or ferrous substances) between the product's inductive coil and the inductive coil in the delivery box. The product battery 310 may be wired to the battery interface 312 to enable the interface 312 to charge/discharge it in a wireless manner via the communication link 318. In particular embodiments, the drone battery 304 and the interface unit 314 in the drone 302 also may be collectively wired to the charging port 306 to enable the power manager 316 to charge/discharge the drone battery 304 and monitor the charging/discharging through the interface unit 314 (as discussed later) in a wireless manner via the communication link 318. The drone's 302 electrical connection to the delivery box 106 may be a Universal Serial Bus (USB) connection, a non-USB connection, or a combination of both, as discussed later below. In particular embodiments, a drone's carrier arm(s) (such as the carrier arm 104 or the side arms 204-205) may be used to conceal the wiring needed for the drone's electrical connections with the delivery box 106.

In certain embodiments, the communication link 318 be established using the Qi protocol, which is an open interface standard for wireless charging that defines wireless power transfer using inductive charging over distances of up to 4 cm (1.6 inches). The Qi protocol has been developed by the Wireless Power Consortium. Generally, to enable charging using a Qi interface, the system may use a charging pad and a compatible device (such as a laptop, a smartphone, and the like), which is placed on top of the pad and charged via resonant inductive coupling. In the embodiment of FIG. 3, the resonant coupling may be provided through the communication link 318 to enable power transfer between the batteries 304, 310. The power manager 316 in the drone 302 may be a software application and may communicate with the battery interface 312 in the product 308 through the interface unit 314, which may use in-band communication (Qi protocol) to establish and maintain the communication link 318.

In particular embodiments, an option for a wired connection between the charging port 306 and the battery interface 312 may be provided in addition to or in place of a wireless connection (such as the wireless link 318). A wired connection may be preferable, for example, when the product 308 does not support wireless charging of its battery 310, or when the configuration of the delivery box 106 does not allow sufficient proximity between the battery interface 312 and the charging port 306 to establish the communication link 318. In the embodiment of FIG. 3, such wired connection is illustrated in a dotted manner and identified with corresponding reference numerals "320", "322," and "323". In some embodiments, at least the wired connection 320 may be a USB connection. The product package 108 may be designed with a USB socket/outlet 322 on the exterior side thereof and may be made pre-wired with a USB cable or other wiring 323 such that the loose end of the USB cable (or other wiring) may be internally connected to an appropriate battery port (not shown) on the product 308 when the product 308 is placed inside the package 108. In this manner, the battery interface 312 may remain electrically connected to the USB socket 322 once the product is packaged. While placing the package 108 inside the delivery box 106, a human (or non-human) operator may plug the charging port 306 in the delivery box 106 (or in the drone itself, as in case of the embodiment in FIG. 4) into the USB socket 322 on the exterior of the product package 108 with a USB cable, thereby electrically connecting the charging port 306 and the battery interface 312 to facilitate power transfer as per teachings of the present disclosure. In some embodiments, the delivery box 106 may be provided with a pair of metallic clamps (not shown) to which the charging port 306 may be wired. The drone unit 302 may contain two or more conductors (not shown) that make contact to the metallic clamps when the drone is holding the delivery box 106. These conductors thus electrically connect the interface unit 314 to the charging port 306 and also electrically connect the drone battery 304 with the product battery 310 through the earlier-described wired connection between the charging port 306 and the battery interface 312. For example, in the sidearm based drone configuration of FIG. 2, each side arm 204-205 may be used to carry an electrical conductor internally and one end of each such conductor may be exposed externally at the end of the corresponding sidearm to connect to the appropriate metallic clamp on the delivery box 106. In some embodiments, the interface unit 314 and the drone battery 304 may be collectively connected to the charging port 306 via a USB connection. It is noted here that one or more of the USB connections discussed herein may be mini-USB connections, micro-USB connections, or a combination of such different types of USB connections. The power delivery may be carried out using, for example, a USB Power Delivery (USB-PD) connection operating on USB-PD specifications. In particular embodiments, Pogo connections (such as a Pogo pin or a Pogo connector, which may or may not use USB) may be implemented to make it easier to connect without the difficulty of a traditional connector.

Instead of the above-described USB connections, there may be non-USB connections in which the socket 322 may be a non-USB outlet, and a connecting cable (or a pair of wires) may be used for each of the (non-USB) connections 320, 323. As before, the socket 322 may be pre-wired and integral to the exterior surface of the product package 108, thereby enabling the battery's 310 connection to the socket 322 during the product's placement in the package 108. The drone unit 302 may be electrically connected to the delivery box 106 via a USB or a non-USB connection, as discussed before. In some embodiments, different types of wired connections than those discussed here may be implemented to provide an electrical connection between the drone battery 304 and the product battery 310.

It is noted here that if the product 308 is capable of supporting both the wired and wireless connections to the charging port 306, only one of these two connections may be implemented. For example, in case of such a product, one or both of the wired connections 320, 323 may not be implemented if the product package 108 and the delivery box 106 allow for the establishment of the wireless link 318 with ease. On the other hand, if it is difficult to establish and maintain the wireless link 318, the wired connections 320, 323 may be deployed through the socket 322 to facilitate the power transfer as per teachings of the present disclosure.

Initially, when the product package 108 is inserted into the delivery box 106 in an appropriate manner and depending on whether a wireless or wired connection is enabled for the product 308, the charging port 306 may establish either a wireless connection (such as the communication link 318) with the battery interface 312 or a wired connection to the battery interface 312, thereby enabling the interface unit 314 to report such connection to the power manager 316. In some embodiments, the power manager 316 and the interface unit 314 may be under operative control of a processor (such as the processor 602 in FIG. 6). As a result, the processor may sense that a wireless or wired connection is established for the power source 304 in the drone unit 302, thereby determining that a product (here, the product 308) containing a rechargeable battery is to be delivered by the drone unit 302. Upon sensing the presence of the product 308, the processor—through the power manager 316—may query the battery charge level of the product battery 310. In case of products that contain batteries that are not substantially fully-charged (such as, for example, products whose batteries are not at least 80% charged) or are charged below a pre-defined threshold, the power manager 316 (under the operative control of the processor) may initiate the transfer of power from the drone battery 304 to the product battery 310. As discussed later below, in some embodiments, such charging of the product battery 310 may depend on the delivery distance. For example, for short distance drone deliveries, it may be possible to use the drone battery 304 to charge the product battery 310.

In certain embodiments, if the power manager 316 senses that the charge level of the drone battery 304 is below a pre-defined threshold, the power manager 316 (under the operative control of the processor) may initiate the transfer of power from the product battery 310 to the drone battery 304 to supplement its charge. Many electronic products (such as, for example, laptops, smartphones, and the like) may have batteries pre-charged to almost 100% level. Therefore, such fully-charged batteries may be used to supply power to the drone battery. As discussed later below, in some embodiments, the charging of the drone battery 304 may depend on the delivery distance. For example, for long distance drone deliveries, it may be desirable to supplement the drone battery 304 (for example, to extend the flight time/radius) by using the charge from the product battery 310.

The drone's processor (such as the processor 602 in FIG. 6) may perform a number of different tasks to initiate and conclude the desired power transfer. For example, in one embodiment, the processor may determine how fast to charge a product/device so that the product is substantially fully charged (for example, to at least 80% charge level) when it reaches its delivery point. For many electronic products with rechargeable batteries, it may not be desirable to ship a product with a completely full battery because having a completely full battery idle for a long period of time may degrade the battery life. Therefore, the product may have been shipped with a lower (or less than full) battery level knowing that the drone delivery will be able to charge the product en route to its destination. In case of charging a product (such as the product 308), the processor may determine the distance to be traveled by the drone 302 to deliver the product package 108 and, through the power manager 316, also may determine the current level of charge in the product battery 310. Based on the delivery distance and the current level of charge in the product battery 310, the processor may determine the rate of charging needed to substantially fully charge the product battery 310. Thereafter, the processor may instruct the power manager 316 to transfer the power from the drone battery 304 to the product battery 310 at the determined rate of charging, while monitoring/querying the charge level of the product battery 310 through the interface unit 314 during the power transfer to determine when the device battery 310 is substantially fully charged (for example, at least 80% charge level). The power transfer may terminate when the device battery 310 is substantially fully charged or when the drone battery 304 is depleted. Such power transfer may be through a wireless connection or a wired connection, which are discussed in detail before.

In particular embodiments, the above-discussed power transfer from the drone battery 304 to the product battery 310 may be initiated by the drone's processor for short-distance deliveries—that is, when the delivery distance (as determined by the processor) is within a pre-defined range/radius. In some embodiments, such short-range power transfer may be carried out to charge the batteries of multiple laptops or other electronic devices (for example, a palette of laptops or smartphones) being carried in a single delivery box. Each product package may be electrically connected (in wired or wireless manner) to appropriate electrical contacts on the delivery box to enable power transfer from the drone battery to the respective product's battery.

On the other hand, as noted before, for long distance drone deliveries—that is, when the delivery distance (as determined by the drone's processor) is beyond a pre-defined range/radius, it may be desirable to supplement the drone battery 304 by using the charge from the product battery 310. For example, in case of long-distance drone delivery of a product that is shipped with a substantially full-charged battery (for example, a battery that is at least 80% charged), such "reverse" power transfer may supplement the drone battery and extend the flight time/radius of the drone. In case of charging the drone battery 304, the processor may determine the distance to be traveled by the drone 302 to deliver the product package 108 and, through the power manager 316, also may determine the current level of charge in the product battery 310. In certain embodiments, if the product battery 310 does not have at least a pre-determined level of charge (for example, 50% charge), the processor may not initiate discharge of the product battery. Based on the delivery distance and the current level of charge in the product battery 310, the processor may determine the rate at which the product battery 310 may be discharged to drain it to a pre-determined level (for example, 20% battery level) before terminating the discharging operation to avoid delivering a product with a fully-discharged battery. In some embodiments, the rate of discharged may be fixed and the processor may not need to determine such rate. Thereafter, the processor may instruct the power manager 316 to transfer the power from the product battery 310 to the drone battery 304 at the determined (or fixed) rate of discharging, while monitoring/querying the charge level of the product battery 310 through the interface unit 314 during the power transfer to determine when the device battery 310 is sufficiently drained. As noted, the power transfer may terminate when the device battery 310 is drained to a pre-determined level (for example, 20% battery level) or the shipping destination is reached. Such power transfer may be through a wireless connection or a wired connection, which are discussed in detail before.

Figure 4:
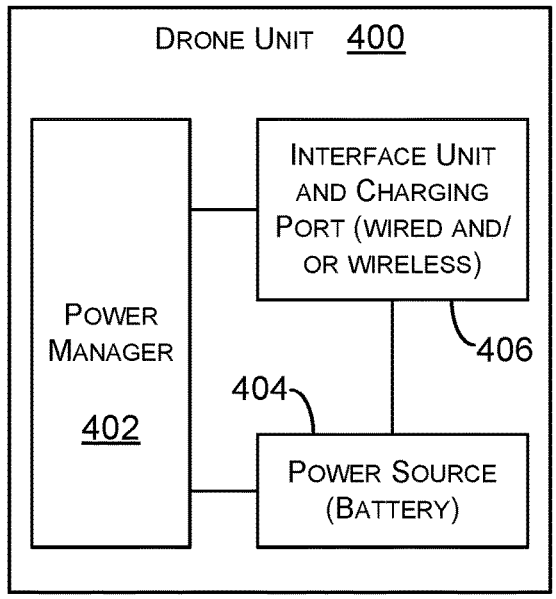
FIG. 4 depicts an exemplary block diagram of a drone unit as per particular embodiments of the present disclosure.

FIG. 4 depicts an exemplary block diagram of a drone unit 400 as per particular embodiments of the present disclosure. Like the drone unit 302 in FIG. 3, the drone unit 400 in FIG. 4 also may include a power manager 402 and a power source (battery) 404, which may be substantially identical to the power manager 316 and the battery 304, respectively, and, hence, additional discussion of the power manager 402 and the battery 404 is not provided for the sake of brevity. In contrast to the drone unit 302, the drone unit 400 may include an integrated interface unit 406 incorporating the functionalities of the interface unit 314 and the charging port 306 shown in FIG. 3. Because of earlier discussion of the interface unit 314 and the charging port 306, additional discussion of the integrated interface unit 406 is not provided for the sake of brevity. It is noted, however, that the drone unit 400 in the embodiment of FIG. 4 may be used when a delivery box (such as the delivery box 106) is not available or not to be used, or when the delivery box does not have the means (such as the charging port 306) to establish an electrical connection with a product's battery interface (such as the interface 312). For simplicity of the drawing, additional components shown in FIG. 3 (such as a delivery box, a product package, and a product) are not shown in conjunction with the drone unit 400 of FIG. 4. It is understood, however, that the drone unit 400 may operate in conjunction with such components in a manner similar to the drone unit 302 in FIG. 3. Any of the drones 102, 202 may have the configuration of the drone unit 400 in FIG. 4. In some embodiments, the drone 400 may be completely different from the drones 102, 202 in FIGS. 1-2, respectively. In any event, the drone 400 may be a UAV that is configured as per teachings of the present disclosure to initiate and terminate power transfer to/from a product battery (such as the battery 310) in the manner discussed before.

Figure 5:
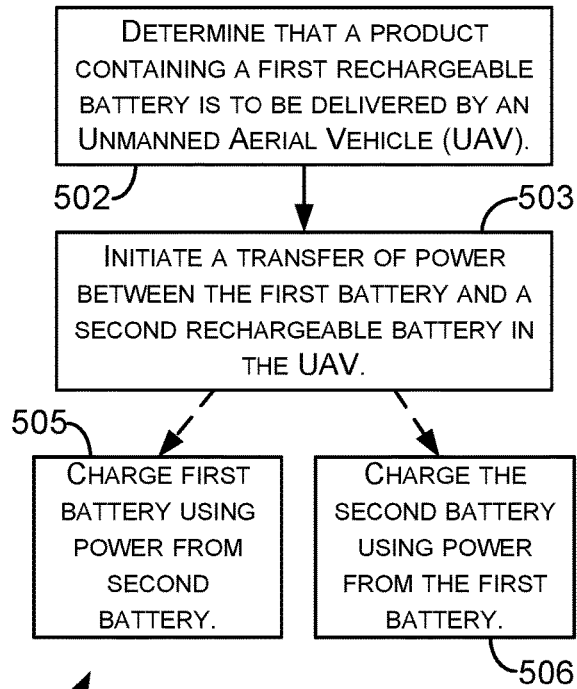
FIG. 5 shows an exemplary flowchart outlining the power transfer methodology in a drone-based delivery as per certain embodiments of the present disclosure.

FIG. 5 shows an exemplary flowchart 500 outlining the power transfer methodology in a drone-based delivery as per certain embodiments of the present disclosure. A processor (such as the processor 602 in FIG. 6) in a drone (like any of the drones shown in FIGS. 1-4) may perform the tasks illustrated in the flowchart 500 to carry out an appropriate power transfer operation. As discussed before, the processor may interact with other drone components (such as, for example, a power manager, an interface unit, and so on) while performing such tasks. More generally, the drone containing the processor may be considered the "actor" that performs the tasks shown in the flowchart 500 of FIG. 5. In some embodiments, the drone/UAV may include relevant hardware and/or software for a power manager (such as the power manager 316 or the power manager 402). In one embodiment, the program code for the power manager (and other relevant program code) may be executed by the processor (not shown) in the drone and, upon execution of the program code, the drone may be operative to perform the tasks shown in FIG. 5.

In the flowchart 500, each block represents one or more tasks that can be implemented in hardware, software, or a combination thereof. In the context of software, the blocks represent computer-executable instructions that, when executed by one or more processors, cause the processor(s) to perform the recited tasks. Generally, computer-executable instructions include routines, programs, objects, modules, components, data structures, and the like that perform particular functions or implement particular abstract data types. The order in which the blocks are described is not intended to be construed as a limitation, and any number of the described tasks can be combined in any order and/or in parallel to implement the process shown in the flowchart 500. For discussion purpose, the process in the flowchart 500, is described with reference to FIGS. 1-4 as described above, although other models, frameworks, systems and environments may be used to implement this process.

Initially, a processor (for example, the processor 602 in FIG. 6) in a drone/UAV (such as, for example, any of the drones 102, 202, 302, or 402) may determine that a product (such as the product 308) containing a first rechargeable battery (such as the battery 310) is to be delivered by the drone/UAV, as noted at block 502. An exemplary approach as to how the processor may make such a determination has been discussed earlier and, hence, is not repeated here. Based on the determination at block 502, the processor may initiate a transfer of power between the first battery (in the product) and a second rechargeable battery (such as the battery 304) in the drone/UAV (block 503). As discussed before, such power transfer may use a wired or wireless connection between the two batteries. As noted at block 505, in certain cases (such as, for example, delivery over a short distance), the drone's processor may charge the first battery (in the product) using power from the second battery (in the drone). On the other hand, as noted at block 506, in some other cases (such as, for example, delivery over a long distance), the drone's processor may charge the second battery (in the drone) using power from the first battery (in the product). Other factors (for example, the level of current charge in a battery) also may affect the direction and/or rate of power transfer, as already discussed before.

From the examples in FIGS. 1-4, it is seen that the present disclosure's approach of power transfer between a drone's battery and a product's battery may significantly add to the many other benefits provided by a drone-based product delivery mechanism. For example, when a product's battery is charged during transit, it would undoubtedly delight the customers because their ordered product/device will arrive fully-charged and ready to go. On the other hand, in case of devices/products already having a substantially fully-charged battery prior to delivery, the battery power may be used to supplement the drone's battery when deliveries are beyond a certain distance. Such additional power to the drone battery may extend the drone's operating range or conserve its battery power on long distance flights.

FIG. 6 illustrates an example configuration of a drone unit (or UAV) 600 as per particular embodiments of the present disclosure. The drone unit 600 may represent any of the previously-discussed drones 102, 202, 302, and 400. The drone 600 may be suitably configured to implement the earlier-discussed power transfer methodology as per teachings of the present disclosure. The drone unit 600 may include one or more processors 602, a memory unit 604, an interface unit 606, one or more electro-mechanical components 608, one or more sensors 610, and a power supply (such as a rechargeable battery) 612, connected to the processor 602 as shown and configured to communicate with each other, such as via one or more system buses (not shown) or other suitable connection.

In one embodiment, the interface unit 606 may be similar to either of the interface units 314 or 406 depending on the design of the drone unit 600 and that of a delivery box (if any) to be used with the drone unit 600. The earlier discussion of interface units 314, 406 remains applicable to the interface unit 606 and, hence, such discussion is not repeated here for the sake of brevity. Similarly, the power source 612 may be similar to either of the batteries 304 or 404 and, hence, discussion of the power source 612 is also not provided for the sake of brevity. It is noted, however, that the battery 612 may provide electrical power to various system components shown in FIG. 6. The battery 612 may be connectable to an AC electrical power outlet and/or may convert solar energy or other renewable energy into electrical power. Furthermore, in some embodiments, the battery 612 may not be a single battery, but may be a collection of individual, rechargeable batteries.

The sensors 610 may include, for example, a touch-screen, a camera, a temperature sensor, a motion sensor, a gravity sensor, a gyroscope/compass, a collision detection sensor, a Global Positioning System (GPS) receiver, and the like. The inputs from the sensors 610 may be processed by the processor 602 to navigate the flight of the drone unit 600 during delivery trips. For remote controlling of the drone unit 600, the sensors 610 may include a receiver of remotely-sent command/control signals including, for example, commands sent via a satellite or a ground-based control station (or human operator). In some embodiments, the interface unit 606 may include one or more communication interfaces for exchanging data (such as command or control data, and any response thereto) via a network (such as a satellite communication network). The communication interfaces can facilitate communications within a wide variety of networks and protocol types, including, for example, wired networks (e.g., Ethernet, Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, Wireless USB, cellular, satellite, etc.), the Internet (or, more generally, an Internet Protocol network), and the like. In some embodiments, the communication interfaces in the interface unit 606 can also provide communication with a charging port (such as the charging port 306 in FIG. 3) and/or a battery interface (such as the battery interface 312 in FIG. 3).

The electromechanical components 608 may include components that enable the drone unit 600 to fly, impart motion during flight, grab and release a delivery box (or product package), and facilitate drone's safe return to ground. Such components may include, for example, one or more rotors, propellers, motors, blades, carrier arms, wheels, pneumatic legs or support mechanism, landing gear, electronic speed controllers, and the like. The components 608 and associated electronic circuits may be under operative control of the processor 602, which, in some embodiments, may activate/deactivate one or more of the components 608 based on the inputs received from relevant sensors 610.

In various embodiments, all of the components and electronic units shown in FIG. 6 may be housed within a single housing (not shown). In other embodiments, the drone unit 600 may not include all of the components and system units shown in FIG. 6.

The processor 602 is a hardware device that may include a single processing unit or a number of processing units, all of which may include single or multiple computing units or multiple cores. When the drone unit 600 is a multiprocessor system, there may be more than one instance of the processor 602 or there may be multiple other processors coupled to the processor 602 via their respective interfaces (not shown). The processor 602 may be implemented as one or more microprocessors, microcomputers, microcontrollers, Digital Signal Processors (DSPs), Central Processing Units (CPUs), Graphics Processing Units (GPUs), state machines, logic circuitries, and/or any devices that manipulate signals based on operational instructions. Among other capabilities, the processor 602 may be configured to fetch and execute computer-readable instructions stored in the memory 604, or other computer-readable media. In some embodiments, the processor 602 may be a System on Chip (SoC).

The memory 604 is an example of non-transitory computer media (e.g., memory storage devices) for storing instructions that can be executed by the processor 602 to perform the various functions described herein. For example, the memory unit 604 may include both volatile memory and non-volatile memory (e.g., RAM, ROM, or the like) devices. Further, in particular embodiments, the memory 604 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. The memory 604 also may be referred to as a "computer storage medium" herein, and may be a medium capable of storing computer-readable, processor-executable program instructions as computer program code that can be executed by the processor 602 as a particular machine configured for carrying out the operations and functions described in the implementations herein.

The computer storage medium, such as the memory 604, may be used to store software and data. For example, the computer storage medium may be used to store the operating system (OS) the drone unit 600, various device drivers for the drone 600, various inputs provided by the operator or a remote controller at run-time, and the data such as sensor feedbacks, results of various calculations (for example, speed of the drone 600, the distance to be traveled, the determined rate of charging the product battery, and the like). As shown in FIG. 6, the memory 604 also may store a power manager application/module 614. The program code for the power manager 614 and the OS may be executed by the processor 602. In some embodiments, the power manager 614 may be implemented as a combination of hardware and software. The hardware portion of the power manager 614 may be a part of the processor unit 602, or may be a stand-alone unit (not shown) under operative control of the processor 602. In particular embodiments, the power manager 614 may represent either of the power managers 316 or 402.

As mentioned before, a non-transitory, computer-readable data storage medium, such as, for example, the memory 604 may store program code or software for the power manager 614 as per particular embodiments of the present disclosure. The processor 602 may be configured to execute the program code for the power manager 614, whereby the drone 600 may be operative to perform various power transfer tasks associated with the power manager 614 (which, as noted before, may represent either of the power manager 316 or 402), as per the teachings of the present disclosure. In particular embodiments, such tasks may include, for example, communication with the interface unit 606, control of the charging/discharging of the drone battery 612, processing of data/signals or other content (such as, for example, the current charge level of the product battery) received from the interface unit 606, monitoring the status of wireless/wired connection with a product's battery, and so on. The program code or software for the power manager 614 may be proprietary software or open source software which, upon execution by the processor 602, may enable the drone 600 to perform operations to carry out power transfer as per teachings of the present disclosure.

In certain embodiments, the power manager 614 may include a smart power manager component that intelligently reads from a product invoice (or from a customer's preference or the company's preference of a given product) whether the product battery may need to be full or not by the time the product is dropped off. Based on this intelligent analysis, the power manager 614 may decide whether to draw the power from the product's battery or the other way around (that is, whether to feed the product's battery from the drone's battery). In some embodiments, the smart power manager component also may draw power from the product battery in times of emergency power drain of the drone's battery, so that the drone can be kept flying and undamaged than ensuring that the product has a full battery. For a multi-product shipment containing more than one product in one box, the shipper or the product supplier/vendor or other entity creating the shipment may use an intelligent software module (not shown) that can decide to mix products with rechargeable batteries and non-battery products in a box so that there is at least one product with a rechargeable battery packed in the delivery box (whenever possible).

The exemplary drone systems described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, processors, or other devices having processing capability, and, hence, are considered machine-implemented. Generally, any of the functions described with reference to the figures can be implemented using software, hardware (e.g., fixed logic circuitry) or a combination of these implementations. The terms "module," "mechanism" or "component" as used herein generally represents software, hardware, or a combination of software and hardware that can be configured to implement pre-scribed functions. For instance, in the case of a software implementation, the term "module," "mechanism" or "component" can represent program code (and/or declarative-type instructions), such as the program code for the power manager module 614, that performs specified tasks or operations when executed on a processing device or devices (e.g., the processor 602). The program code can be stored in one or more computer-readable memory devices or other storage devices. Thus, the processes, components and modules described herein may be implemented by a computer program product.

Furthermore, this disclosure provides various example implementations or embodiments, as described and as illustrated in the drawings. However, this disclosure is not limited to the implementations described and illustrated herein, but can extend to other implementations, as would be known or as would become known to those skilled in the art. Reference in the specification to "one embodiment," "particular embodiments," "this implementation," "some embodiments", or other terms of similar import, means that a particular feature, structure, or characteristic described is included in at least one implementation or embodiment, and the appearances of these phrases in various places in the specification are not necessarily all referring to the same implementation/embodiment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
    determining, by a processor in an Unmanned Aerial Vehicle (UAV), that a product containing a first battery is to be delivered by the UAV; and
    initiating, by the processor, a transfer of power between the first battery and a second battery in the UAV.

2. The method of claim 1, wherein the initiating comprises one of the following:
    charging, by the processor, the first battery using power from the second battery; and
    charging, by the processor, the second battery using power from the first battery.

3. The method of claim 2, wherein charging the first battery comprises:
    determining, by the processor, a distance to be traveled by the UAV to deliver the product and a current level of charge in the first battery;
    further determining, by the processor, a rate of charging to substantially fully charge the first battery upon delivery of the product, wherein the rate of charging is determined based on the delivery distance and the current level of charge in the first battery; and
    charging, by the processor, the first battery at the determined rate of charging.

4. The method of claim 1, wherein the initiating comprises one of the following:
    transferring, by the processor, power between the first battery and the second battery using a wireless connection; and
    transferring, by the processor, power between the first battery and the second battery using a wired connection.

5. The method of claim 4, wherein the wireless connection comprises a Qi interface.

6. The method of claim 4, wherein the wired connection comprises one of the following:
    a Universal Serial Bus (USB) connection; and
    a USB Power Delivery (USB-PD) connection.

7. The method of claim 4, wherein the determining comprises:
    sensing, by the processor, that the wireless connection or the wired connection is established; and
    based on the sensing, determining, by the processor, that the product is to be delivered by the UAV.

8. The method of claim 1, wherein the initiating comprises one of the following:
    initiating the transfer of power from the second battery to the first battery based on determining that a first power level of the first battery is below a first pre-defined threshold; and
    initiating the transfer of power from the first battery to the second battery based on determining that a second power level of the second battery is below a second pre-defined threshold.

9. The method of claim 1, wherein the initiating comprises one of the following:
    initiating the transfer of power from the first battery to the second battery based on determining that a delivery destination for the product is beyond a first pre-determined distance; and
    initiating the transfer of power from the second battery to the first battery based on determining that the delivery destination for the product is within a second pre-determined distance.

10. A product delivery system comprising:
    a drone operable to deliver a product containing a first rechargeable battery, wherein the drone contains a second rechargeable battery that powers the drone and
    an electrical connection to facilitate a transfer of power between the first and the second batteries during delivery of the product by the drone.

11. The system of claim 10, wherein the electrical connection comprises one of the following:
    a wireless connection; and
    a wired connection.

12. The system of claim 10, wherein one of the following applies:
    the electrical connection is between the product and the drone; and
    the electrical connection is between the product and a delivery box in which the product is carried by the drone, wherein the delivery box is electrically connected with the drone.

13. The system of claim 10, wherein the electrical connection comprises:
    a first inductive coil electrically connected to the second battery; and
    a second inductive coil in the product electrically connected to the first battery and electromagnetically aligned with the first inductive coil to enable wireless transfer of power between the first and the second batteries.

14. The system of claim 13, wherein one of the following applies:
    the first inductive coil is part of the drone; and
    the first inductive coil is part of a delivery box in which the product is carried by the drone, wherein the delivery box is electrically connected with the drone.

15. The system of claim 10, wherein one of the following applies:
    the drone is operable to charge the first battery using power from the second battery; and
    the drone is operable to charge the second battery using power from the first battery.

16. The system of claim 10, wherein the electrical connection comprises:
    a first wire electrically connecting the first battery to an outlet outside a package containing the product; and
    a second wire electrically connecting the second battery to the outlet.

17. The system of claim 10, wherein the electrical connection comprises one of the following:
    a Qi interface based wireless connection; and
    a Universal Serial Bus (USB) based wired connection.

18. A delivery box comprising:
    a housing that receives a product package containing a product that has a first rechargeable battery, wherein the delivery box is carried by a drone to deliver the product package at a destination; and
    a charging port that provides an electrical connection between the first rechargeable battery and a second rechargeable battery in the drone that powers the drone, thereby facilitating a transfer of power between the first and the second batteries during delivery of the product package by the drone.

19. The delivery box of claim 18, wherein the charging port comprises at least one of the following:
 an inductive coil to support a wireless connection between the first and the second batteries; and
 a wiring outlet to support a wired connection between the first and the second batteries.

20. The delivery box of claim 18, wherein the electrical connection comprises one of the following:
 a wireless connection; and
 a wired connection.

\* \* \* \* \*